Patented Apr. 22, 1952

2,593,681

UNITED STATES PATENT OFFICE 2,593,681

METHOD OF MAKING FREELY FLOWABLE COMPOSITION OF TWO RUBBERS

Arthur J. Leydon, Waltham, Mass., assignor to Dewey and Almy Chemical Company, North Cambridge, Mass., a corporation of Massachusetts No Drawing. Application October 30, 1948, Serial No. 57,631

5 Claims. (Cl. 260—33.6)

My invention relates to fluid compositions of organic liquids and natural and synthetic rubbers, and to films and coatings produced by removal of the liquid from the composition. My invention makes it possible to produce freely flowable compositions, and to derive from them films and coatings which may be composed exclusively of rubber and contain no extraneous materials.

Before rubber films and coatings can be made by flowing, dipping, or by similar methods, the rubber must be converted from the solid, elastic mass characteristic of the crepe rubber or smoked sheets of commerce to a liquid form. One way of making rubber a fluid has been to treat it with a solvent. But solvent solutions of rubber become very viscous when they contain only a small amount of rubber in proportion to the liquid. When a rubber solution is dried to form a film, the film is thin because the solution originally contained only a small amount of rubber. Additionally, films or coatings derived from solvent solutions of natural rubber and some synthetic rubbers are more subject to oxidation, to de-polymerization and to swelling effects of oils, greases, and hydrocarbons. These difficulties reduce the life and range of usefulness of the film.

Another way of converting rubber into liquid form has been to disperse rubber in water. In this instance, dispersion of the rubber can only be brought about by using materials such as casein, glue, soap and clays as dispersing agents and protective colloids. Water dispersions of rubber have had wide use because they are usually mobile liquids which flow freely, contain a high proportion of rubber, and produce relatively thick films. But the dispersing or protective agents permanently remain in the dried film. They interfere with the surface to surface contact of the individual particles of rubber, and reduce the cohesiveness, toughness, elasticity, and resiliency of the dried film. A more serious objection is that the dispersing agents or colloids which are used to produce the dispersions are necessarily affected by water, steam, and in some cases by oils, greases and hydrocarbons. The films soften if exposed to water or steam and in some cases deteriorate if exposed to the organic materials.

The present invention makes it possible to produce liquid rubber compositions having a high content of rubber solids, but possessing low viscosity, and also makes it possible to produce films or coatings from the compositions which contain rubber alone and which retain in substantially unimpaired degree the elasticity, cohesiveness, toughness and original characteristics of the original rubber from which the coatings were made.

The present invention is accomplished by first intermilling two or more rubbers one of which is insoluble and the other soluble in the chosen solvent, and then disrupting and dispersing the insoluble rubber by the swelling of the soluble rubber as it passes into solution in the solvent. The resulting composition is a two phase liquid mass, the external phase of which consists of solvent and rubber—a rubber solution—in the sense that no particles are visible when the centrifuged, diluted external phase is examined by the ultra-microscope. The internal phase consists of small, discrete, clearly visible particles of the insoluble rubber dispersed and suspended in the rubber solution under the microscope.

Therefore, despite a very high concentration of rubber, for the internal phase (insoluble rubber) may comprise 70% or more of the total rubber solids present, the viscosity is low; the material flows easily; it produces thick films when dried; and since the film is composed of nothing but rubber it will not re-wet or soften when exposed to hot water or steam, a characteristic which limits the usefulness of the conventional water dispersions of rubber made with soap, clay or other dispersing agents.

The milling of one rubber into the other is done on conventional rubber working machinery, for example, roll mills, Banbury mixers or analogous equipment and, to facilitate this milling, the suspended rubber should sometimes be softened, but the suspended rubber is never dissolved and persists in the composition in the form of discrete particles.

Microscopic examination and analysis of the two components derived by diluting and centrifuging the fluid composition shows that one component consists of rubber in the form of particles which, although they may be swollen, are still discrete and clearly visible, while examination of the other component fails to show any particles at all. It is clear, therefore, that one rubber is in solution while the other still remains in the solid phase. None of the particles of the compound are visible to the naked eye.

The word "rubber" when used in the specification and the claims and the words "the class of rubber'" mean one of the following materials: natural rubber, polymers, interpolymers, and copolymers of conjugated diolefins, i. e., polybutadiene, butadiene-styrene copolymers, butadiene-acrylonitrile copolymers, polymers and copolymers of methylpentadiene; polymeric forms of chlorine substitution products of conjugated diolefins, i. e., polychloroprene; polymers of nonconjugated systems, i. e., polyisobutylene and copolymers of isobutylene and isoprene; and condensation polymers of the polysulphide type. All of said polymeric compounds are rubbery and elastic at room temperature even when unplasticized.

Rubbers derived from different chemical sources usually behave very differently in a given solvent. For example, natural rubber is soluble in octane; polychloroprene is not. In addition, rubber from the same chemical sources, but having different ratios in the monomers of the resulting copolymer, may be soluble or insoluble in the selected solvent, depending upon monomeric ratio.

I have used the words "rubber having different solubility characteristics" and mean thereby rubbers which may on proximate qualitative analysis be found to contain the same ingredients but which nonetheless are affected by the solvent in materially different degrees. For example, butadiene-styrene and butadiene-acrylonitrile copolymers of high monomeric ratios of butadiene to styrene and butadiene to acrylonitrile are affected by solvent in materially different degrees from copolymers wherein the monomeric ratio is low.

In general, "rubbers" can be used either as the dissolved or the suspended material provided the two rubbers have different solubility characteristics and a proper liquid medium is chosen, the choice of the suspended rubber depending on the particular qualities required of the film, and the use to which it is to be put.

Suitable liquids are—among others—hexane, octane, methylethyl ketone, acetone and toluol. Benzol and chlorinated solvents may be used where toxic effects are not objectionable. The essential feature of the liquid is that it shall form a solution of one rubber and shall not dissolve although it may swell the other rubber. Combinations of liquids which together form a solvent may be employed. It is possible to employ liquids having high rates of evaporation thus cutting down the drying time and reducing the expense of the drying equipment.

The proportion of liquid employed depends particularly on the use to which the composition is to be put and on the type of machine by which it is to be applied, for instance, spreaders, coaters or can-end lining machines, but in all cases sufficient liquid is used to dissolve one of the rubbers and to disperse the other rubber in the solvent. If the rubber dispersed in particle form is one chosen for a particular characteristic, for instance, resistance to oils, greases, etc., it retains in the final film unimpaired its inherent qualities. While the final film has some of the characteristics of both rubbers, the proportion of discrete particles to dissolved rubber may be so great in the dried film that there is no significant loss of any of the attributes of the suspended rubber. In this way it is possible to produce films having the oil, grease and water resistance of the dispersed rubber and to produce films having great strength, elasticity and "fight."

It will be understood that inert fillers and pigments of various kinds in proper amounts, for instance, wood flour, ground cork, ground hard rubber, flock, metallic oxides, silex, etc., may be added to the composition. Such fillers are merely mechanically entrapped and do not interfere with the rubber-to-rubber surface contact of the two kinds of rubber composing the basic composition.

The solvent compounds embodying my invention have the following advantages:

1. They have high rubber solids content and low viscosity comparable with water base compounds, but do not include any materials which are subject to deterioration in the presence of water or steam.

2. They are much less subject to depolymerization and oxidation, which usually occur in the case of existing solvent compounds.

3. A much greater variety of compounds for a greater variety of uses can be made. The production of compounds which are best adapted to the particular uses to which they are to be put is made possible by the freedom of choice of the types of rubber.

4. Compounds with a very small amount of liquid to be evaporated subsequently can be made, hence short drying times and small drying apparatus with less stock in process and less expenditure for machinery.

5. Rubbers which are soluble with great difficulty or are soluble only in toxic solvents may be used in non-toxic solvents as the dispersed rubber.

In general the compound embodying my invention has substantially all the advantages of solvent compounds and of water dispersions without their disadvantages and in addition certain advantages which neither compound has.

The examples forming a part hereof illustrate the practice of the invention with various rubbers and solvents. The compounds described are base compounds to which may be added other ingredients such as fillers, waxes, plasticizers, resins, pigments, etc., according to the use to which the particular compound is to be put.

Although certain modifications of the following technique may be made, it is my experience that the lowest viscosities and the finest particle size of the suspended rubber particles are achieved when the following procedure is completely carried out. First, the two rubbers are milled together on a conventional rubber mill which has been tightly set and the rolls of which are chilled. It is recommended that the milling be continued from 15 to 20 minutes after which the stock is immediately transferred to a Werner-Pfleiderer type of mixer equipped with a sigma blade. The solvent then is run into the working mass in small increments and no fresh addition of solvent should be made until the preceding increment has been wholly taken up by the rubber stock. The working in the Werner-Pfleiderer in all instances should be continued until a smooth, creamy, lump-free, fine-grained dispersion results.

In a limited number of instances, I find that if the two rubbers have been first thoroughly milled together on the rolls, the solvent may then be added in a conventional rubber churn. The swelling and disruption caused by the solution of one of the rubbers in the churn is sufficient to produce a dispersion of the remaining rubber.

Examples

| Ex-ample | Dispersed Rubber | | Dissolved Rubber | | Solvent | | Centi-poises Viscosity | Total Solids |
|---|---|---|---|---|---|---|---|---|
| | Type Rubber | No. of Parts | Type Rubber | No. of Parts | Type Solvent | No. of Parts | | |
| | | | | | | | | Percent |
| 1 | Polychloroprene ("GN") | 500 | Natural rubber | 125 | Octane | 900 | 4,400 | 43.3 |
| 2 | Polychloroprene ("GN") | 500 | Butadiene-styrene (GR-S) | 125 | Hexane / Toluene | 900 / 100 | 9,100 | 44.0 |
| 3 | Natural rubber | 500 | Butadiene-acrylonitrile | 125 | Acetone | 880 | 9,600 | 45.7 |
| 4 | Isobutylene-isoprene (GR-I) | 500 | Butadiene-acrylonitrile | 125 | Acetone | 1,300 | 3,400 | 43.5 |
| 5 | Butadiene-acrylonitrile | 500 | Isobutylene-isoprene (GR-I) | 125 | Octane | 1,200 | 7,000 | 42.5 |
| 6 | Butadiene-acrylonitrile | 500 | Butadiene-styrene (GR-S) | 125 | Hexane / Methylethyl-ketone | 1,100 / 200 | 4,400 | 38.0 |
| 7 | Butadiene-acrylonitrile | 500 | Isobutylene (80,000 m. w.) | 125 | Octane | 1,500 | 11,600 | 35.1 |
| 8 | Polysulphide condensation polymer | 400 | Butadiene-acrylonitrile | 100 | Acetone | 2,000 | 6,000 | 35.1 |
| 9 | Butadiene-acrylonitrile | 500 | Butadiene-styrene (GR-S) | 125 | Octane | 1,200 | 2,360 | 38.0 |
| 10 | Polychloroprene ("GN") | 500 | Butadiene-styrene (GR-S) / Isobutylene-isoprene (GR-I) | 50 / 50 | Octane | 1,550 | 1,240 | 33.9 |
| 11 | Butadiene-acrylonitrile | 500 | Butadiene-styrene (GR-S) / Isobutylene-isoprene (GR-I) | 50 / 100 | Octane | 1,600 | 3,530 | 32.7 |
| 12 | Polychloroprene ("GN") | 500 | Butadiene-styrene (GR-S) | 75 | Octane | 875 | 1,400 | 40.3 |
| 13 | Polychloroprene ("GN") | 500 | Butadiene-styrene (GR-S) | 50 | Octane | 850 | 4,400 | 45.9 |

NOTE: Some of these compounds gel on standing while others never gel. However, those which gel can be restored to liquidity by stirring when gelling begins. For some purposes gelled compounds can be used.

This application is a continuation-in-part of my application Serial No. 651,371, filed March 1, 1946, now abandoned.

I claim:

1. The method of making a freely flowable rubber composition which is smooth, lump-free and fine grained with substantially all of the particles invisible to the naked eye and comprising a homogeneous two-phase liquid mass consisting essentially of two rubbery elastic millable polymers having different solubility characteristics in the same solvent, and a volatile organic liquid which is a solvent for one of said polymers and a non-solvent for the other thereof, one of said polymers being dissolved in the solvent forming a solution and the other being dispersed as fine, undissolved particles in the solution, the external phase being constituted by the solution, said composition being characterized by the fact that microscopic examination and analysis of the two rubbery components derived by diluting and centrifuging the fluid composition shows that one component consists of rubber in the form of particles which, although they may be swollen, are still discrete and clearly visible while examination of the other component fails to show any particles at all, comprising intermilling two of said polymers, said two polymers being initially separate, subjecting the milled mass to mechanical treatment in the presence of the organic liquid, and continuing the mechanical treatment in the liquid until the insoluble rubber is disrupted and dispersed in the form of discrete particles suspended in the solution of the soluble rubber.

2. The method according to claim 6 in which the insoluble, dispersed rubber is polymerized chloroprene and the continuous phase of the dispersion is a solution of a butadiene-styrene copolymer.

3. The method according to claim 1 in which the internal phase of the dispersion is a polymerized butadiene-acrylonitrile copolymer and the external phase of the dispersion is a solution of butadiene-styrene copolymer.

4. The method according to claim 1 in which the external phase of the dispersion is a solution of a butadiene-styrene copolymer.

5. The method according to claim 1 in which the external phase of the dispersion is a solution of a butadiene-styrene copolymer and the solvent liquid is hexane.

ARTHUR J. LEYDON.

REFERENCES CITED

The following references are of record in the file of this patent:

UNITED STATES PATENTS

| Number | Name | Date |
|---|---|---|
| 626,092 | Petmecky | May 30, 1899 |
| 2,103,884 | Wentworth | Dec. 28, 1937 |
| 2,300,352 | Earle | Oct. 27, 1942 |
| 2,433,656 | Egan et al. | Dec. 30, 1947 |
| 2,459,739 | Groten et al. | Jan. 18, 1949 |
| 2,469,141 | Alexander | May 3, 1949 |
| 2,514,222 | Reid | July 4, 1950 |

FOREIGN PATENTS

| Number | Country | Date |
|---|---|---|
| 109,746 | Australia | Feb. 6, 1940 |
| 592,310 | Germany | Feb. 5, 1934 |

OTHER REFERENCES

India Rubber World, November 1943, page 165.